United States Patent [19]
Lange et al.

[11] Patent Number: 5,229,608
[45] Date of Patent: Jul. 20, 1993

[54] READ-OUT SYSTEM FOR A LUMINESCENT STORAGE SCREEN

[75] Inventors: Gottfried Lange; Hans-Erich Reinfelder, both of Erlangen, Fed. Rep. of Germany

[73] Assignee: Siemens Aktiengesellschaft, Munich, Fed. Rep. of Germany

[21] Appl. No.: 820,255

[22] Filed: Jan. 14, 1992

[30] Foreign Application Priority Data

Jan. 15, 1991 [EP] European Pat. Off. ........ 91100416.6

[51] Int. Cl.⁵ ............................................. G01N 23/04
[52] U.S. Cl. ................................................. 250/327.2
[58] Field of Search ................ 250/327.2 E, 327.2 F, 250/327.2 G, 484.1 B, 235; 358/494

[56] References Cited

U.S. PATENT DOCUMENTS

| | | |
|---|---|---|
| 4,410,799 | 10/1983 | Okamoto ...................... 250/327.2 F |
| 4,587,036 | 5/1986 | Degenhardt . |
| 4,914,294 | 4/1990 | Fukai et al. .................. 250/327.2 E |
| 5,017,781 | 5/1991 | Lange et al. . |
| 5,049,749 | 9/1991 | Lange et al. . |

FOREIGN PATENT DOCUMENTS 0032521 7/1981 European Pat. Off. .
0167747 1/1986 European Pat. Off. .

OTHER PUBLICATIONS

Brochure of Holotek Ltd., Rochester, N.Y., Edition No. 8/84.

Primary Examiner—Paul M. Dzierzynski
Assistant Examiner—Richard Hanig
Attorney, Agent, or Firm—Hill, Steadman & Simpson

[57] ABSTRACT

A read-out system for a luminescent storage screen of the type used to latently store an x-ray in an x-ray diagnostics apparatus includes a radiation source which generates a scan beam, which is deflected over the storage screen to cause the storage screen to luminesce pixel-by-pixel, with the emitted light being supplied to an image reproductions circuit for generating a visible image. A portion of the scan beam is coupled-out and is conducted to a correction detector unit, which supplies a correction signal containing information regarding the intensity, and further information about the location, of the deflected scan beam. The output signals of the detector and the correction detector are superimposed so that any errors caused by fluctuations in the brightness of the scan beam, or non-uniformities in the structure of the detector, will be corrected.

9 Claims, 2 Drawing Sheets

READ-OUT SYSTEM FOR A LUMINESCENT STORAGE SCREEN

BACKGROUND OF THE INVENTION

1. Field of the Invention

The present invention is directed to an x-ray diagnostics installation of the type having a luminescent storage screen for the latent storage of x-ray images, and a read-out system for the screen.

2. Description of the Prior Art

An x-ray diagnostics apparatus is disclosed in European Application 0 387 369, corresponding to the U.S. Pat. No. 5,049,749, wherein a luminescent storage screen in an x-ray diagnostics apparatus is irradiated with x-rays in an exposure station so as to produce a latent x-ray image in the form of a pattern of electron holes stored in potential traps in the phosphor layer of the screen. Subsequently, the exposed luminescent storage screen is conveyed to a read-out station, wherein the entire surface of the storage screen is scanned pixel-by-pixel with a separate radiation source, for example a laser, so that the holes stored in the traps are excited and can fall back to a recombination state, with the energy difference being emitted in the form of light quanta having respectively different wavelengths compared to the wavelength of the radiation source. The light emitted in this manner is acquired by a detector, so that the stored x-ray image is read out from the screen. This image is then supplied in a known manner to an image reproduction system, which either displays the image on a monitor, or produces a hard copy of the image, or both.

For planar scanning of the luminescent storage screen, the laser beam, for example, is deflected in the horizontal direction by a holographic deflection device, and is also shifted in the vertical direction, so that all of the picture elements on the luminescent storage screen are excited in succession. The light emitted by the luminescent storage screen is acquired by an optical collector, and is imaged on the light-sensitive input surface of a detector, or a plurality of detectors. The output signal from the detector is supplied, for example, to a conventional video chain for reproduction of the x-ray image on a monitor.

As described in German Patent 3 347 207, corresponding to U.S. Pat. No. 4,587,036, europium-activated barium fluoro-bromine chloride compounds can be excited by visible light, and can be used as stimulable phosphors in storage screens of this type. For exciting this stimulable phosphor, a standard He-Ne laser can be used, which generates a focused beam with a wavelength of 633 nm.

Such known x-ray diagnostics systems, however, have the disadvantage that fluctuations in the output signal of the detector may be generated which are not due to brightness differences in the x-ray image, but are instead caused by fluctuations in the intensity of the laser beam. Moreover, non-uniformities in the structure of the detector may cause the generation of a non-linear output signal, which varies dependent on the position of the scan position of the luminescent storage screen, i.e., on the deflection of the scan beam.

SUMMARY OF THE INVENTION

It is an object of the present invention to provide an x-ray diagnostics apparatus of the type described above which is of compact construction and wherein errors due to fluctuations in the read-out beam intensity or due to non-uniformities in the detector structure can be corrected.

The above object is achieved in accordance with the principles of the present invention in a read-out system wherein a portion of the radiation scan beam is coupled-out, and is conducted to a correction detector, which generates a correction signal containing information regarding the intensity and the location of the deflected scan beam. The output signals of the primary detector, and the correction detector, are superimposed for the purpose of correction. Both errors due to fluctuations in the intensity of the scan beam and due to non-uniformities in the structure of the detector, which may cause an output signal which fluctuates dependent on the location of the scanned picture element, can be corrected.

Preferably, both the primary or main detector and the correction detector are identical in function. This can be achieved by providing the correction detector with a structure which is the same as that of the primary detector, for example the correction detector may simply be a smaller version of the primary detector. It is possible, however, to make the two detectors identical, of the same size.

The correction detector may be formed by a photodiode line, to which the scan beam, coupled-out following the deflection unit, is supplied. The outputs of the photodiode line are supplied to a correction circuit which contains an electrical simulation of the transfer behavior of the detector. Instead of a photodiode line, however, the correction detector may be a single photodetector, to which a part of the radiation from the radiation source is supplied, with a generator connected to the deflection device which supplies a signal corresponding to the degree of deflection. The output signals from the photodetector and from the generator are supplied to an electrical simulator, which simulates the transfer behavior of the detector.

Preferably, the signals of the detector units are linked with each other for the purpose of standardization such as, for example, supplying the output signals of the detectors to a division stage. Visibility can be improved when the linked output signals of the detectors are supplied to a circuit stage having a non-linear characteristic, for example having a root characteristic.

DESCRIPTION OF THE PREFERRED EMBODIMENTS

Figure 1:
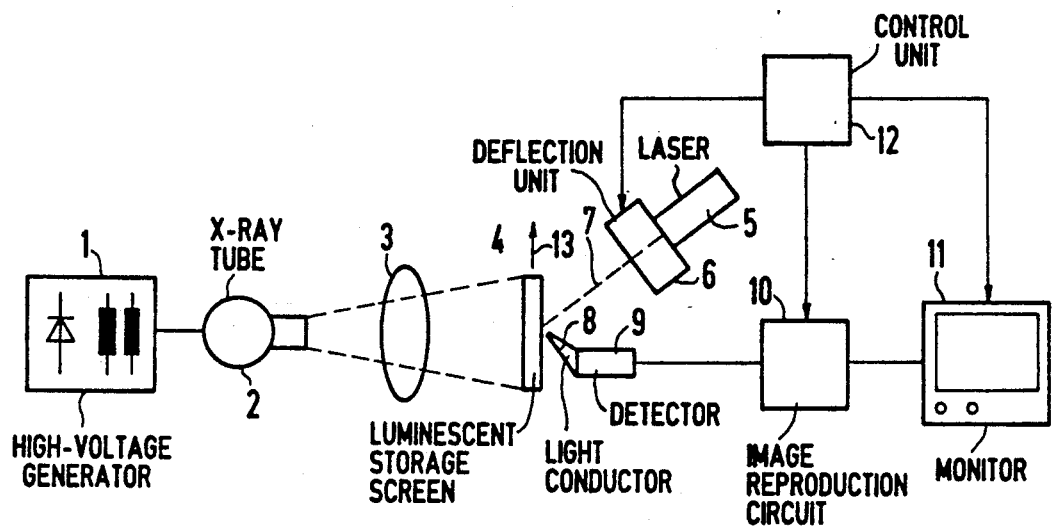
FIG. 1 is a schematic block diagram of known x-ray diagnostics system, of the type in which the read-out system constructed in accordance with the principles of the present invention can be used.

An x-ray diagnostics apparatus is shown in FIG. 1 having a high-voltage generator 1 which feeds an x-ray tube 2, which emits x-rays that penetrate a patient 3. The x-rays attenuated by the patient 3 in accordance with the patient's transparency are incident on a luminescent storage screen 4. This incident radiation image, as described above, produces electronic holes in the luminescent storage screen 4, which are stored in traps of the stimulable phosphor, so that a latent image on the patient 3 is stored in the screen 4 after irradiation.

For reproducing the latent, stored image, the luminescent storage screen 4 is usually excited by a radiation source, for example by a laser 5. The laser 5 is preceded by a deflection unit 6, which deflects the scan beam 7 across the luminescent storage screen 4 line-by-line. The deflection unit 6 for the scan beam 7 may be, for example, an electro-optical beam deflector for the horizontal deflection. Vertical deflection can be undertaken by displacing the luminescent storage screen 4 in the direction of the arrow 13, so that the entire surface of the luminescent storage screen 4 can be successively scanned pixel-by-pixel by the scan beam 7.

A light conductor 8 acquires the light emitted by the luminescent storage screen 4, and conducts the light to a detector 9, which measures the brightness of the scanned picture elements and converts the measured brightness into an electrical signal which is supplied to a reproduction circuit 10. The reproduction circuit 10 generates a video signal in a known manner for display on a monitor 11 from the individual, analog output signals of the detector 9. During image reproduction, a control unit 12 synchronizes operation of the deflection unit 6, the reproduction circuit 10 and the monitor 11. The image reproduction circuit 10 may include image memories, a processing circuit and transducers operated in a known manner.

Figure 2:
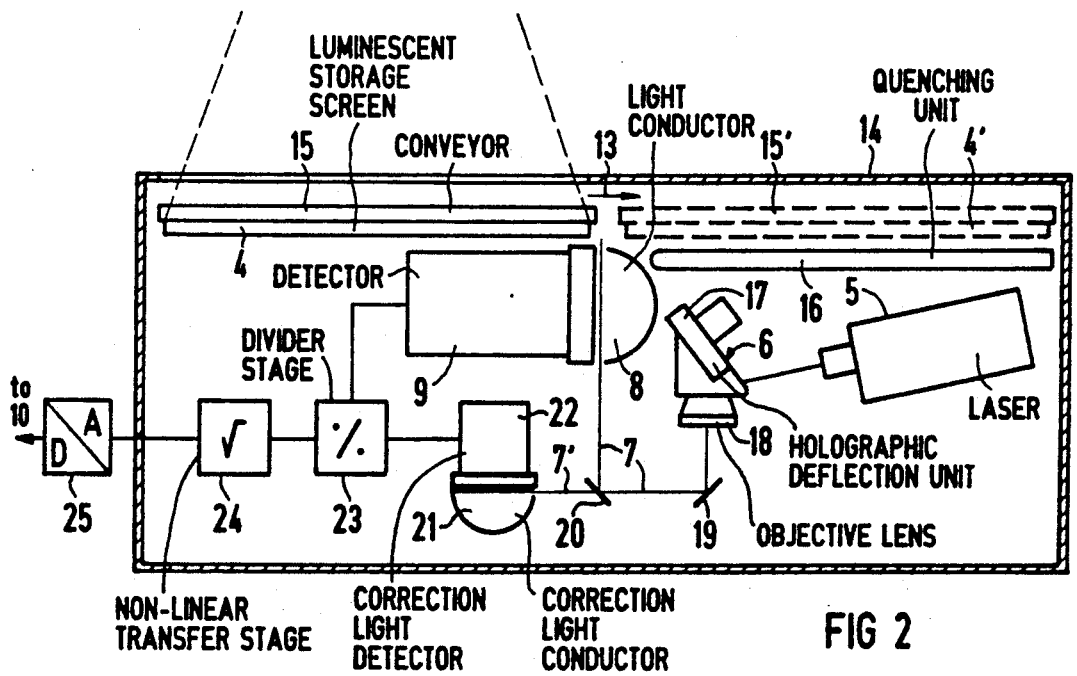
FIGS. 2, 3 and 4 are side schematic views of different embodiments of a read-out system constructed in accordance with the principles of the present invention, for use in the x-ray diagnostics system of FIG. 1.

An exposure station is shown in FIG. 2 wherein the luminescent storage screen 4 is secured to a stray radiation grid 15, arranged in a housing 14 and forming the conveyor, in accordance with the principles of the present invention. In the illustrated position, the stray radiation grid 15, together with the luminescent storage screen 4, is situated in a first position, i.e., the exposure position, wherein the luminescent storage screen 4 is irradiated by x-rays. After irradiation has been completed, the conveyor with the stray radiation grid 15 displaces the luminescent storage screen 4 in the direction of the arrow 13. The luminescent storage screen 4 is thus simultaneously scanned by the read-out system, consisting of components 5 through 9, arranged beneath luminescent storage screen 4. The scan beam 7 generated by the laser 5 is supplied to a holographic deflection unit 17, operating as part of the deflection unit 6, which has an objective lens 18 which focuses the scan beam 7 on the luminescent storage screen 4. Such a holographic deflection unit 17 is disclosed in detail, for example, in the brochure of Holotek Limited, Rochester, N.Y., Edition No. 8/84. For adequate deflection of the scan beam 7 to occur over the entire width of the luminescent storage screen 4, even given small dimensions thereof, the scan beam 7 is multiply deflected by deflection mirrors 19 and 20, so that a convoluted beam path results. The scan beam 7 is incident between the light conductor 8 and the light detector 9, as described European Application 0 363 522, corresponding to U.S. Pat. No. 5,017,781. Standard light conductors composed of silica glass, plexiglass or the like, however, can also be employed.

As shown in FIG. 2, in accordance with the principles of the present invention, the deflection mirror 20 is a partially reflecting mirror, so that a portion of the deflected scan beam 7 can pass through the mirror 20, as scan beam 7', and is thus coupled-out of the main beam. The scan beam 7' may be conducted to a smaller version of the primary or first detector device, formed by the conductor 8 and the detector 9, formed by a correction light conductor 21 and a correction detector 22. The unit formed by the correction light conductor 21 and the correction detector 22 may have a white or a mirrored surface on which the scan beam 7' is incident, from which the reflected light is by the correction light conductor 21 to the correction detector 22, so that a signal is produced in the correction detector 22 which corresponds to the brightness of the scan beam 7' at the deflected location, and also corresponds to the transfer or transmission behavior of the detector unit formed by the conductor 8 and the detector 9. The output signals of the detectors 9 and 22 are supplied to a division stage 23, which forms the quotient of the two signals for the purpose of standardization. The output signal from the division stage 23 is supplied through a circuit stage 24 having a root characteristic to an analog-to-digital converter 25, which is connected to the image reproduction circuit 10.

When a scan event has ended, the conveyor 15 will have displaced the luminescent storage screen 4 to such an extent that it is situated in a second position indicated by dashed lines in Figure at 4' and 15'. A quenching unit 16 undertakes a quenching with the screen 4 in this position. The quenching unit 16 may be arranged beneath the luminescent storage screen 4' and the conveyor.

The entire read-out system is accommodated in a housing 14 which may, for example, be secured to a portable frame. It thus possible to push the exposure unit beneath a patient support as needed, with the patient 3 to be examined being situated on the support, so that the desired exposures can be produced. The exposure station, however, may be rigidly connected to a patient support table, or can be secured to a stand in a height-adjustable fashion.

As noted above, the corrector detector device, formed by the correction light conductor 21 and the correction detector 22, may simply be a smaller version of the detector device formed by the light conductor 8 and the detector 9, wherein the length of the scan beam 7' is shorter than the length of the scan beam 7 between the deflection mirror 20 and the luminescent storage screen 4. It is also possible, however, that the correction detector device be identical in size and structure to the primary or main detector device.

The luminescent storage screen 4 may be applied on the conveyor 15 if the conveyor 15 is in the form of frame which leaves the entire exposure area unobstructed, both in an upward direction toward the x-ray tube 2 and in a downward direction toward the scan components.

If a stray radiation grid is employed, the luminescent storage screen 4 may be directly secured thereto, for example by gluing. In this case, the stray radiation grid may simultaneously function as the carrier for the conveyor means 15.

Figure 3:
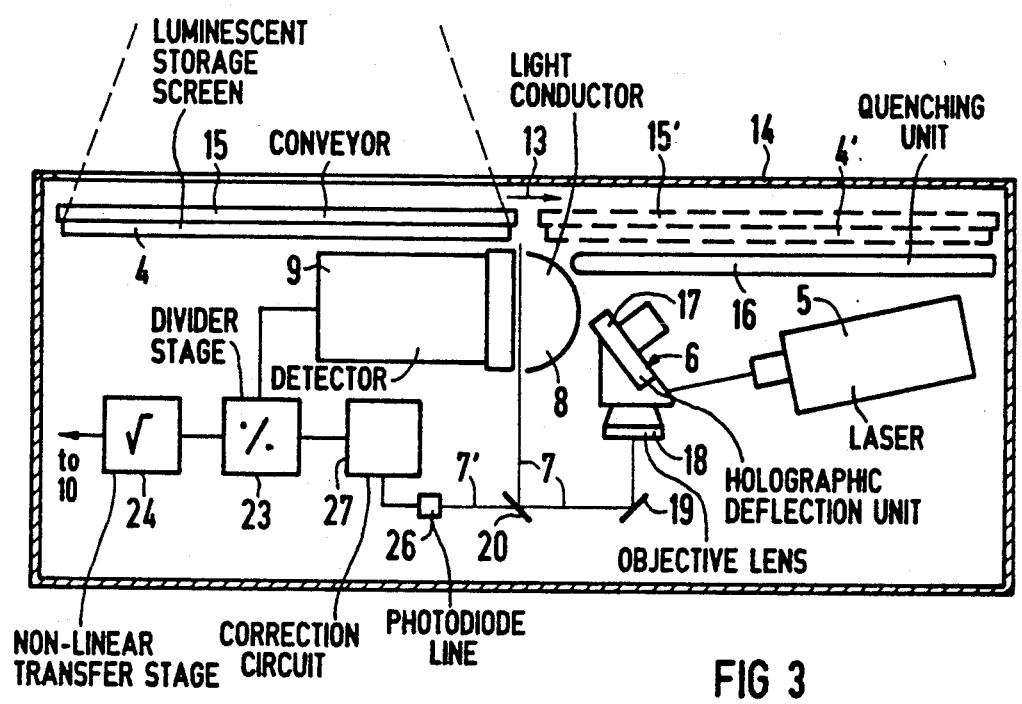

A further embodiment of the read-out system is shown in FIG. 3, wherein components identical to those in FIG. 2 have the same reference symbols. Instead of a correction light conductor 21 and a correction detector 22, in the embodiment of FIG. 3 only one photodiode line 26 is employed, which is connected to a correction circuit 27. The correction circuit 27 electrically simulates the detector device formed by the light conductor 8 and the detector 9. Due to the plurality of photodiodes in the photodiode line 26, information regarding the location at which the scan beam 7 is incident on the luminescent storage screen 4 can be received. The size of the output signals of the photoelements of the photodiode line 26 indicates the intensity of the scan beams 7 and 7'. From this information, the correction circuit 27 forms a correction signal, which is linked by the division stage 23 to the read-out signal from the detector 9. As a result, errors produced by fluctuations in the intensity of the scan beam 7, as well as by the non-linear behavior of the detector dependent on the location, are compensated.

Figure 4:
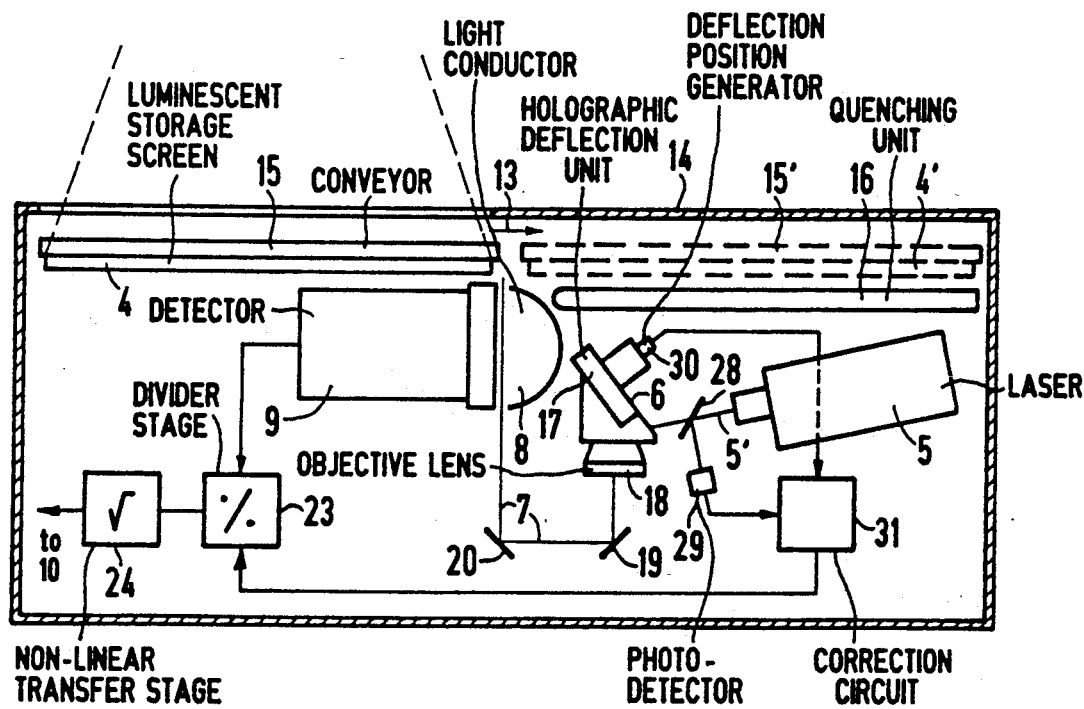

Another embodiment of the invention is shown in FIG. 4, wherein components which are the same as those previously described have the same reference symbols. In the embodiment of FIG. 4, a fully reflective deflection mirror 20' is used, instead of the partially reflecting mirror 20.

The non-deflected laser beam 5' is deflected by a photodetector 29 in the embodiment of FIG. 4 by a partially reflecting mirror 28. This takes place preceding the deflection unit 16, formed by the holographic deflection unit 17, so that the photodetector 29 produces a signal which corresponds only to the intensity of the laser beam 5'. In order to obtain location information, and thus to implement a correction of the transfer behavior of the detector 9, the deflection unit 6 is provided with a generator 30 which generates a signal indicating the location at which the scan line of the scan beam 7 is incident on the luminescent storage screen 4. The photodetector 29 and the generator 30 are connected to a simulator 31, which calculates a correction signal on the basis of the brightness signal from the photodetector 29 and the location signal from the generator 30. This correction signal 30 can be superimposed on the output signal of the detector 9 in the division stage 23.

A simple and error-corrected read-out of x-ray images stored in a luminescent storage screen, which has a compact structure, is thus obtained in accordance with the principles of the x-ray diagnostics apparatus disclosed herein.

Although modifications and changes may be suggested by those skilled in the art, it is the intention of the inventors to embody within the patent warranted hereon all changes and modifications as reasonably and properly come within the scope of their contribution to the art.

We claim as our invention:

1. A read-out system for a storage luminescent screen in which an x-ray image is latently stored comprising:

a radiation source for generating a scan beam which causes a phosphor layer in said luminescent storage screen to luminesce;

means for deflecting said scan beam over said luminescent storage screen line-by-line to generate light corresponding to said x-ray image;

detector means for detecting the light emitted by one of said lines of said luminescent storage screen;

image reproduction means for generating a visual image from said light corresponding to said latent x-ray image; and means for coupling a portion of the radiation of the deflected scan beam out of said scan beam;

correction detector means to which the coupled-out portion of the deflected scan beam is supplied line-by-line for generating a correction signal containing information regarding the intensity and location of the deflected scan beam; and means for superimposing the output of said detector means with the output of said correction detector means.

2. A read-out system as claimed in claim 1 wherein said detector means and said correction detector means function identically.

3. A read-out system as claimed in claim 1 wherein said correction detector means and said detector means have the same structure but differ in size.

4. A read-out system as claimed in claim 3 wherein said correction detector means is a smaller, identical version of said detector means.

5. A read-out system as claimed in claim 1 wherein said detector means and said correction detector means are identical in structure, size and function.

6. A read-out system as claimed in claim 1 wherein said correction detector means comprises:

a photodiode line to which said coupled-out portion of said scan beam is supplied following said deflection means; and correction circuit means receiving outputs from said photodiode line for electrically simulating the transfer behavior of said detector means.

7. A read-out system as claimed in claim 1 further comprising means for combining the output signals of said detector means and said correction detector means with each other for standardization.

8. A read-out system as claimed in claim 7 wherein said means for combining is a division stage.

9. A read-out system as claimed in claim 7 further comprising a circuit stage having a non-linear transfer characteristic to which the signals combined in said means for combining are supplied.

* * * * *